(12) United States Patent
Ritter et al.

(10) Patent No.: US 7,225,763 B2
(45) Date of Patent: *Jun. 5, 2007

(54) FUMIGATION SYSTEM FOR A DIESEL ENGINE

(75) Inventors: Gregory W. Ritter, Gillette, WY (US); Terry A. Jones, Gillette, WY (US)

(73) Assignee: TGI, Inc., Gillette, WY (US)

( * ) Notice: Subject to any disclaimer, the term of this patent is extended or adjusted under 35 U.S.C. 154(b) by 99 days.

This patent is subject to a terminal disclaimer.

(21) Appl. No.: 11/099,726

(22) Filed: Apr. 6, 2005

(65) Prior Publication Data

US 2005/0199224 A1 Sep. 15, 2005

Related U.S. Application Data

(63) Continuation of application No. 10/797,803, filed on Mar. 10, 2004, now Pat. No. 6,901,889.

(51) Int. Cl.
  *F02B 3/00* (2006.01)
  *F02M 21/02* (2006.01)

(52) U.S. Cl. .................. 123/27 GE; 123/525; 123/672

(58) Field of Classification Search ........... 123/27 GE, 123/525, 527, 528, 672, 681, 682, 683, 684
See application file for complete search history.

(56) References Cited

U.S. PATENT DOCUMENTS

| | | | |
|---|---|---|---|
| 3,792,690 A | 2/1974 | Cooper | 123/3 |
| 4,391,095 A | 7/1983 | Virk | 60/286 |
| 4,535,728 A | 8/1985 | Batchelor | 123/27 |
| 4,597,364 A | 7/1986 | Young | 123/27 |
| 4,958,598 A * | 9/1990 | Fosseen | 123/1 A |
| 5,546,908 A | 8/1996 | Stokes | 123/480 |
| 5,765,656 A | 6/1998 | Weaver | 180/65.3 |
| 6,095,102 A | 8/2000 | Willi | 123/27 |
| 6,145,495 A | 11/2000 | Whitcome | 234/525 |
| 6,189,523 B1 | 2/2001 | Weisbrod et al. | 123/525 |
| 6,202,601 B1 | 3/2001 | Ouellette | 123/27 |
| 6,286,482 B1 * | 9/2001 | Flynn et al. | 123/435 |
| 6,422,015 B2 | 7/2002 | Long | 60/605.2 |
| 6,543,395 B2 | 4/2003 | Green | 123/27 |
| 6,550,430 B2 | 4/2003 | Gray | 123/27 |
| 6,863,034 B2 | 3/2005 | Kern | 123/3 |
| 6,892,531 B2 * | 5/2005 | Rim | 60/295 |
| 2003/0077210 A1 | 4/2003 | Nau | 422/194 |
| 2004/0123849 A1 | 7/2004 | Bryant | 123/563 |
| 2004/0177837 A1 | 9/2004 | Bryant | 123/559.1 |

* cited by examiner

*Primary Examiner*—John T. Kwon
(74) *Attorney, Agent, or Firm*—Marsh Fischmann & Breyfogle LLP

(57) ABSTRACT

A system and method is provided to reduce particulate and $NO_x$ emissions from diesel engines through the use of a duel-fuel fumigation system. The system injects a gaseous-fuel flow into the air intake stream of a diesel engine. This results in more complete combustion within the engine as well as reduced diesel fuel usage, which each work to reduce emission outputs of the engine. As presented, the system is operative to meter the gaseous-fuel flow into the diesel engine based on one or more engine parameters such as, for example, exhaust gas temperature, exhaust oxygen levels, engine speed and/or engine load. Monitoring one or more engine parameters allows fine-tuning the flow of gaseous fuel into the engine and thereby prevents loss of engine power at high-end loads while maintaining favorable emission outputs over substantially the entire operating range of the engine.

20 Claims, 4 Drawing Sheets

FUMIGATION SYSTEM FOR A DIESEL ENGINE

CROSS REFERENCE TO RELATED APPLICATION

This is a continuation of U.S. patent application Ser. No. 10/797,803 entitled "Fumigation System for a Diesel Engine" filed on Mar. 10, 2004 now U.S. Pat. No. 6,901,889.

FIELD OF THE INVENTION

The present invention relates generally to duel-fuel engine systems. More particularly, the present invention relates to a fumigation system for controlling the injection of a gaseous-fuel into an air intake of a diesel engine.

BACKGROUND

Due to the high thermal efficiency achieved by compression-ignited engines (e.g., in comparison with spark-ignited engines), these engines are commonly utilized in industrial applications. The high efficiency of compression-ignited engines, such as diesel engines, is due in part to the ability to use higher compression ratios than spark-ignited engines (i.e., gasoline engines) as well as the ability to control power output without a throttle. In the latter regard, the lack of a throttle eliminates throttling losses of premixed charges typical in spark-ignited engines thereby resulting in significantly higher efficiency at part load. However, compression-ignited engines and diesel engines in particular typically cannot achieve the low oxides of nitrogen ($NO_x$) and particulate emission levels that are possible with spark-ignited engines.

Diesel engines typically inject diesel fuel into the engine's combustion chamber when that chamber's piston is near the end of the compression stroke. The high pressure present in the chamber ignites the diesel fuel. Due to this mixing controlled nature of diesel combustion, a large fraction of the fuel exists at a very fuel-rich equivalence ratio. That is, the fuel and air in the combustion chamber are not necessarily a homogenous mixture. This may result in incomplete combustion of the diesel fuel, which tends to result in high particulate emissions. Furthermore, the fuel-rich equivalence ratio can also lead to high flame temperatures in the combustion process, which results in increased $NO_x$ emissions. As tougher environmental standards are being enacted for diesel sources, users of diesel engines are looking for ways to lower emissions. One solution is to reduce the amount of diesel injected into the combustion chamber, which reduces the equivalence ratio and works to reduce particulate and $NO_x$ emissions; however, it also reduces engine power.

In order to reduce particulate and $NO_x$ emissions levels from diesel engines, such engines may also be partially or completely converted for use with gaseous-fuels such as, compressed natural gas (CNG), liquid natural fuels (LNG) such as ethanol, and liquid or liquefied petroleum gas (LPG), such as propane. Utilization of such gaseous-fuels with diesel engines not only provides for more complete combustion and thereby enhanced fuel economy, but also typically results in lower engine emissions. However, gaseous-fuels typically do not have the centane value required to allow for their ignition through compression. Accordingly, diesel engines must be modified to use such fuels. Methods for converting a diesel engine to consume gaseous-fuels typically fall into three categories. The first is to convert the engine to a spark-ignited engine; a second is to convert the engine to allow for the direct injection of gaseous-fuels into the combustion chamber with injected diesel; and a third is a dual-fuel technology, in which the gaseous-fuel is mixed with all or a portion of the intake air of the engine. As will be appreciated, the second and third methods utilize injected diesel (i.e., pilot diesel) to ignite the gaseous-fuel. In this regard, the combustion of the gaseous-fuel results in more complete combustion of the diesel. Furthermore, as the gaseous-fuel allows the engine to produce additional power, less diesel is injected into the cylinders.

Conversion to a spark-ignition system and/or a direct gaseous-fuel injection system for utilizing gaseous-fuels with a diesel engine each typically require substantial modification to the diesel engine. Such modifications may include replacement of cylinder heads, pistons, fuel injection system and/or duplication of many engine components (e.g., injection systems). Accordingly, these systems are typically expensive and oftentimes unreliable. On the other hand, dual-fuel systems require little modification to existing engines.

Duel-fuel operation where gaseous-fuels are mixed with intake air prior to the introduction of that air into the engine is known in the art as fumigation. The mixture of gaseous-fuel and intake air is introduced into each cylinder of the engine during the intake stroke. During the compression stroke of the piston, the pressure and temperature of the mixture are increased. Near the end of the compression stroke, a small quantity of pilot diesel fuel from the engine's existing diesel fuel injection system is injected into the cylinder. The pilot diesel ignites due to compression and in turn ignites the mixture of gaseous-fuel and intake air. As will be appreciated, such fumigation systems may be retrofit onto existing diesel engines with little or no modification of the existing engine. Furthermore, engines using such fumigation systems may typically be operated in a dual-fuel mode or in a strictly diesel mode (e.g., when gaseous-fuel is not available).

SUMMARY OF THE INVENTION

It is an object of the present invention to provide a diesel fumigation system which can be installed on diesel engines of varying sizes and configurations.

Another objective of the present invention is to provide a diesel fumigation system that is operative to reduce the emissions of $NO_x$ and particulates from a diesel engine.

Another objective is to provide gaseous-fuel to a diesel engine based on the varying requirements or demands of the engine.

The inventors of the present invention have recognized that dual-fuel systems heretofore have suffered two main disadvantages, that have prevented widespread use of such systems. The first disadvantage is typically encountered at high load operating conditions when elevated temperature and pressure in the engine during the compression strokes makes the intake air/gaseous-fuel mixture susceptible to premature detonation or knocking. Furthermore, at such high loads, some gaseous-fuels (e.g., natural gas) lack the thermal energy (i.e., BTUs) required to maintain a desired power output of the engine. The second disadvantage is encountered at low engine load where the gaseous-fuel and air mixture may be too lean for satisfactory combustion. In this instance, fuel consumption may actually increase, as may the emissions of hydrocarbons (i.e., unburned gaseous-fuels) and particulates. Each of these problems may be broadly termed a gaseous-fuel metering problem of a gaseous-fuel flow volume to the engine.

Both of the above noted disadvantages are particularly acute in diesel engines, which run at varying load levels during operation (e.g., on-road and off-road vehicles). Such engines require the volume of gaseous-fuel injected into the intake air flow to vary with the varying requirements or demands of the engine in order to maintain desired power and emission outputs.

The inventors of the present invention have realized that metering based on a load level of a diesel engine provides a good starting point for fine tuning a gaseous-fuel flow in order to achieve improved emissions and/or enhanced fuel economy over a wide range of operating conditions. For instance, in one method for metering the volume of a gaseous-fuel flow based on the varying requirements or demands of the engine, a fumigation system may utilize a valve that is actuated in response to boost pressure of a turbocharger interconnected to a diesel engine. In this regard, as a load on the diesel engine increases, the turbocharger generates increased boost pressure. Once this boost pressure reaches a predetermined level, the valve may be partially opened to permit gaseous-fuel to be supplied to the air intake. As the boost pressure further increases, the valve opens further to allow more gaseous-fuel flow to the intake. However, in this method no gaseous-fuel is supplied at low load levels (e.g., idle) as no boost pressure is generated at such load levels. Therefore, the system fails to provide any emissions benefits at low load levels. Furthermore, at high load levels, where the boost pressure may fully open such a valve, excess gaseous-fuel may flow into the intake air stream, which may result in knocking and/or lowered engine performance. In this regard, strict load-based metering is often, by itself, inadequate for diesel engines that experience varying load levels.

Accordingly, the inventors have recognized that additional or alternate means for metering the volume of a gaseous-fuel flow in order to fine-tune that flow volume may, in many instances, be desirable. In this regard, it has been determined that by monitoring one or more engine parameters such as, for example, exhaust gas temperature, exhaust oxygen levels, and/or engine speed, the flow volume of the gaseous-fuel may be adjusted (i.e., in conjunction with or independent of load based metering) to prevent loss of power at high-end loads while maintaining favorable emission outputs over substantially the entire operating range of the engine.

According to a first aspect of the present invention, a gaseous-fuel fumigation system for interconnection to a diesel engine is provided. The system includes a first valve disposed in a flow path between a gaseous-fuel supply and an air intake stream of a diesel engine. The first valve is operative to regulate a flow volume of gaseous-fuel (i.e. from the gaseous-fuel supply) through the flow path based on a load level associated with the engine. A second valve, disposed in series with the first valve in the flow path is operative to further regulate the flow volume of the gaseous-fuel through the flow path prior to the gaseous-fuel reaching the air intake stream of the engine. The second valve is operative to further regulate the flow volume based on, at least in part, an oxygen content of exhaust gases in an exhaust stream of the engine.

Various refinements exist of the noted features in relation to the subject first aspect of the present invention. These refinements and/or additional features may exist individually or in any combination. For instance, the gaseous-fuel system may be interconnected to any of a variety of differently configured diesel engines. That is, such a fumigation system may be incorporated into heavy industrial application (e.g., railroad engines), power generation systems and/or on and off-road diesel vehicles. Furthermore, such a system may be incorporated into original equipment manufacturer (OEM) equipment, or, such a system may be retro-fit onto an existing diesel engine. Additionally, it will be noted that the gaseous-fuel may be injected into the air stream of an engine in any appropriate manner. In this regard, the flow path may be directly coupled to an air intake stream in order to directly inject fuel into that stream, or, and outlet of the flow path may be disposed relative to an air intake such that the gaseous-fuel is drawn into the engine with ambient air.

As used herein, the term valve is meant to include any mechanism for varying the flow of a fluid through a flow path. Such valves include, without limitation, mechanical valves operative to restrict a cross-sectional area of a flow path as well as pressure regulating valves that are operative reduce the pressure and/or volume of a gas passing across the valve. Accordingly, the pressure of the gaseous-fuel supply and/or the size (i.e., cross-sectional size) of the flow path may be selected for a particular application.

It will be noted that while the first and second valves are disposed in series, the order of those valves is unimportant. In this regard, the first and second valves may be operated independently and a total flow volume passing through the two valves will be the same irrespective of their order. Generally, however, the first valve will establish a first flow volume and the second valve will act as a leaning valve that is operative to establish a second flow volume between zero and 100% of the first flow volume. The second flow volume is then injected into the intake air stream. In this regard, the second valve can be utilized to prevent any gaseous-fuel flow from reaching the diesel engine if circumstances dictate eliminating the supply of gaseous-fuel.

As noted, the first valve regulates the flow volume of the gaseous-fuel in relation to a load level associated with the engine. In one particular embodiment, this load level is determined from boost pressure produced by a turbo-charger attached to the diesel engine. In this regard, the boost pressure may be utilized to open a spring-actuated valve to variably open a flow path through the valve. As will be appreciated, as the engine load level increases, the boost pressure also increases. This increased boost pressure may further open the first valve such that increased flow volume of gaseous-fuel may pass through. As will be appreciated, use of such a spring-actuated valve may allow for preventing the passage of any gaseous-fuel through the valve until a predetermined boost pressure is achieved. Furthermore, the valve may be adjustable to allow a user to establish the engine load level necessary to initially and/or fully open the valve. Though discussed in relation to a spring-actuated valve, it will be appreciated that other valve types may be utilized. For example, an electronically actuated valve (e.g., using a stepper motor) operative in relation to the engine's governor and/or an RPM sensor may also be utilized to establish a gaseous-fuel flow volume based on such an engine load level.

In order for the second valve to regulate (e.g., fine tune) the load based gaseous-fuel flow volume based on an oxygen content of exhaust gases, the system will typically include an oxygen sensor disposed within an exhaust stream of the engine. In this regard, a controller may receive an output signal from a sensor and/or convert such a signal into an oxygen content. This controller may then control the operation of the second valve in order to increase or decrease the volume of the gaseous-fuel flow through the second valve and thereby the flow volume reaching the air intake stream of the engine.

To fine tune the gaseous-fuel flow, the controller may further include programming (e.g., software, hardware and/or firmware) that maintains one or more predetermined operating conditions for the engine. In this regard, the controller may be operative for engine performance and/or emissions purposes to maintain at least a predetermined minimum oxygen content in the oxygen stream. For example, if the exhaust stream is oxygen depleted (i.e., beneath a predetermined desired amount), unburned hydrocarbons are passing through the engine and hence, increasing emissions outputs. The controller may be operative to adjust the gaseous-fuel flow volume through the second valve (e.g., reduce the volume) to reestablish a desired oxygen content in the exhaust stream. Accordingly, ensuring that at least a minimum desired oxygen content is present within the exhaust gases allows for ensuring complete combustion of the gaseous-fuel and/or diesel fuel within the engine.

According to another aspect of the invention, a gaseous-fuel fumigation system for interconnection to a diesel engine is provided wherein the volume of a gaseous-fuel flow through a flow path between a gaseous-fuel supply and an air intake stream is controlled based on the oxygen content of an exhaust stream of the engine. More particularly, the system includes an oxygen sensor disposed within the exhaust stream of the engine and a controller operative to adjust a first valve in the flow path to maintain a predetermined minimum oxygen content in the exhaust stream. In a preferred embodiment, the controller includes an oxygen content adjuster that is operative to allow a user to set a predetermined minimum oxygen content. As will be appreciated, this allows a user to select a minimum oxygen content based on one or more engine-specific parameters. This allows customizing such a fumigation system for use with a wide variety of differently configured diesel engines.

Variations and refinements exist of the present aspect. Such variations and refinements may exist in any combination. For instance, the controller may be a stand-alone unit or incorporated into one or more existing processors associated with the engine. What is important is that the controller is operable to determine an oxygen content from the sensor output and provide an output signal operative to adjust (e.g., open and/or restrict) a valve disposed within the flow path between a gaseous-fuel supply and an air intake stream of the engine.

In order to allow a user to set a predetermined minimum oxygen content for the exhaust stream of an engine, the oxygen sensor disposed within that exhaust must be operable to accurately read a range of oxygen contents for a wide range. In this regard, a wide band oxygen sensor is utilized that is capable of accurately identifying oxygen content between about 1% and about 22%. Furthermore, use of such an oxygen sensor allows for establishing and maintaining a desired oxygen content within the exhaust stream. As will be appreciated, oxygen sensors utilized for automotive catalytic converter applications utilize an oxygen sensor having a preset value. Typically, the operation of the engine is adjusted to be within a percentage value of the preset value of the oxygen sensor. This results in cyclic engine operation. That is, the exhaust gases are either above or below the predetermined set point, but never necessarily converge on that set point. The wide band oxygen sensor allows for more accurate oxygen sensing and therefore the ability to establish and maintain an oxygen level within an exhaust stream (i.e., non-cyclic operation).

According to another aspect of the present invention, a gaseous-fuel fumigation system used in providing gaseous-fuel at low engine load levels is provided. In this regard, a first valve is disposed in the flow path between a gaseous-fuel supply and an air intake stream of a diesel engine. This first valve is operative to move from a closed position to at least a partially open position in response to a predetermined boost pressure from a turbo charger associated with the engine. As will be appreciated, until the boost pressure exceeds the predetermined minimum value, the valve remains closed. Such conditions often exist at idle in diesel engines. Accordingly, the system utilizes a bypass port that passes through the first valve for maintaining a predetermined minimum flow of gaseous-fuel across the valve while the valve is in the closed position. This allows for reduced emissions associated with the use of gaseous-fuels at low engine load levels. In one embodiment, the system further includes an adjuster that allows selectively adjusting the flow volume of the gaseous-fuel through the bypass port. Accordingly, the by-pass flow volume at low engine loads (e.g., idle) may be tailored for a specific engine.

According to another aspect of the present invention, a method for operating a gaseous fumigation system interconnected to a diesel engine is provided. The method includes establishing a first fluid flow of gaseous-fuel based on a load level of a diesel engine. An oxygen content in the exhaust stream of the engine is identified and, based on that oxygen content, the flow volume of gaseous-fuel is regulated to establish a second flow volume that is between zero and 100% of the first flow volume. The second flow volume is then injected into the air intake stream of the diesel engine. This method allows for the fine-tuning (i.e., metering) of a load based gaseous-fuel flow such that performance and/or emissions outputs may be maintained at high and/or low load levels in a diesel engine.

The present method may be utilized with diesel engines that run at constant operating speeds (i.e. point source engines) and/or with diesel engines having varying load requirements (e.g., on and/or off-road vehicles). In the latter regard, the load level of the diesel engine may fluctuate in an almost continuous manner. Accordingly, the first flow volume will likewise fluctuate. Furthermore, the regulation of the first gaseous-fuel flow will likewise fluctuate to maintain one or more desired parameters including, for example, the oxygen content of the exhaust, engine speed and/or exhaust gas temperatures. In this regard, it will be noted that one or more variables may be monitored to provide a system that can shut down gas injection to the engine when any of a number of predetermined variables are exceeded.

In this regard, logic within a controller may monitor one or more such variables such that gaseous-fuel flow may be adjusted accordingly. For example, if an exhaust gas temperature exceeds a predetermined maximum amount, the gaseous-fuel supplied to the diesel engine may be reduced. If the exhaust gas temperature continues to exceed the predetermined maximum value (i.e., the system will not stabilize at a desired value), the gaseous-fuel flow may be shut off entirely. Similar systems may be set up for engine rpm such that the engine doesn't over-speed, which may damage the engine. As presented, the method provides for a multiple redundancy system for preventing damage to an engine utilizing a fumigation system.

In any of the above aspects, the emissions of a diesel engine may be significantly reduced without effecting the power output of that engine. This is due in part to more complete combustion of diesel fuel within the engine due to the inclusion of the gaseous-fuel as well as the reduction of diesel fuel utilized by the engine. Of note, any gaseous fuel may be utilized including, without limitation, natural gas, methane, propane, hydrogen, vaporized ethanol, vaporized methanol, and/or any other gas or vapor having adequate combustion properties. Further, it will be noted that the above-noted fumigation systems may be set to minimize the diesel fuel utilized by an engine. This has significant benefits in natural gas and/or methane gas well production applications. In such applications, natural gas engines or diesel are often utilized for pumping and/or compressing gas from wells into pipelines. Due to the low BTU value of the natural gas, such natural gas engines are often considerably larger and more expensive than a diesel engine having a similar power rating. In this regard, it is desirable to utilize diesel engines though these diesel engines may be remotely located and require frequent servicing (e.g., replenishment of diesel fuel). By incorporating a fumigation system onto these remotely located engines such that they utilize gaseous-fuel, of which there is a ready supply, the rate of diesel usage may be significantly reduced thereby lowering the service requirement of such engines.

DETAILED DESCRIPTION

Figure 1:
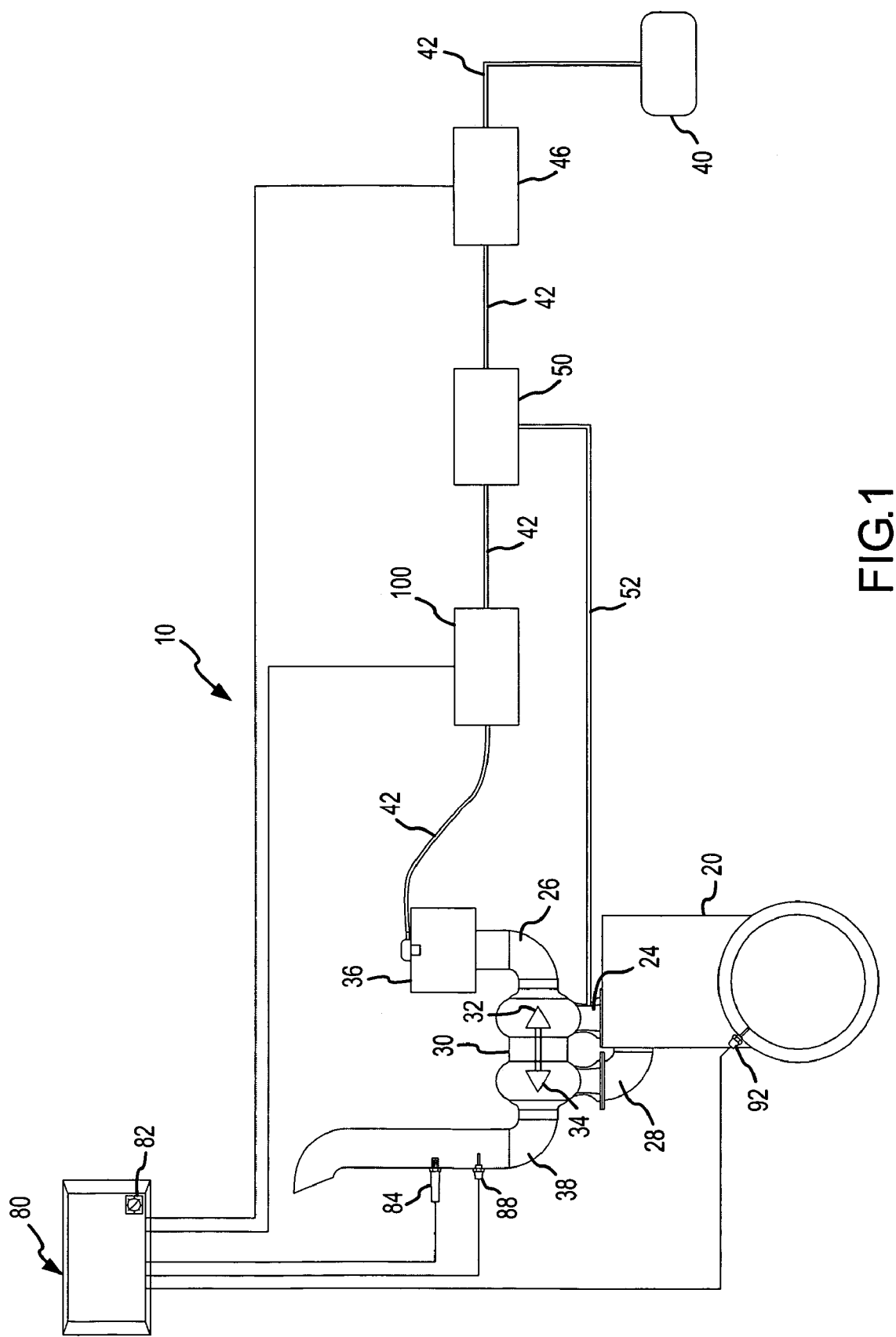
FIG. 1 is a schematic view of a first embodiment of the fumigation system of the present invention.

The present invention will now be discussed in relation to the accompanying drawings, which at least partially assist in illustrating its various pertinent features. FIG. 1 shows a schematic view of a first embodiment of a dual-fuel fumigation system 10 interconnected to a turbocharged diesel engine 20. The fumigation system 10 is applicable to a variety of diesel engine applications and may be utilized in any of a variety of environments where diesel engines are utilized. For example, the fumigation system 10 may be utilized with stationary power generation systems as well as on-road and off-road diesel powered vehicles. That is, the system may be utilized with diesel engines designed to operate at a set load level as well as with diesel engines having varying load requirements due to, for example, idling needs, acceleration needs, cruising needs, etc. Furthermore, it will be noted that the fumigation system 10 is discussed in relation to its applicability to turbocharged diesel engines, however, it will be appreciated that certain aspects of the invention are not limited to such applications.

The particular internal characteristics of the turbocharged internal combustion engine 20 are not of particular importance for the present invention. In this regard, it will be noted that the fumigation system 10 may be interconnected to a multitude of differently configured diesel engines 20. As shown, the engine 20 includes a turbocharger 30, which provides pressurized intake air to the engine 20 during operation at load. The turbocharger 30 includes an impeller 32 that is interconnected to a turbine 34. The impeller 32 is disposed within an air inlet line 26 of the engine 20 while the turbine 34 is disposed within an exhaust output 38 of the engine 20. As is conventional, the turbine 34 receives exhaust gas from an exhaust manifold 28 of the diesel engine 20. The exhaust gas rotates the blades of the turbine 34, which causes the impeller 32 to likewise rotate, thereby compressing air supplied to the impeller 32 through the air inlet line 26. The compressed air is discharged from the impeller 32 through the inlet manifold 24 where it is supplied to air inlet ports within the diesel engine 20. By means of the turbocharger 30, air supplied to the engine 20 is compressed, which enhances the performance of the engine 20.

The exact internal configuration of the engine diesel 20 is unimportant for the present invention as the gaseous fumigation system 10 disclosed herein may be interconnected to a variety of differently configured engines. Typically, the engine 20 will include a number of cylinder assemblies, each having an intake port, an exhaust port, and a fuel injector therein. Each cylinder assembly will further include a piston for compressing gasses within the cylinder. The fuel injector is utilized to inject diesel fuel into the cylinder (e.g., when the piston is at or near top dead center), causing combustion of the fuel/air mixture.

Irrespective of the exact configuration of the diesel engine 20, the engine 20 may be equipped and/or retrofit with the dual-fuel fumigation system 10. As shown in FIG. 1, the fumigation system includes a gaseous-fuel supply 40 for providing a fuel flow to the air intake 36 of the engine 20 via a gas supply conduit 42. Of note, the outlet of the gas supply conduit 42 may be disposed relative to the air intake 36 such that gas emitted from the end of this gas supply conduit 42 may be drawn into the air intake 36. In this regard, the gaseous-fuel may pass through a filter associated with the air intake 36 prior to entering the engine 20. As will be discussed herein, a series of three valves are disposed between the gaseous-fuel supply 40 and the air intake 36. It will be noted that the order of the valves is unimportant for the operation of the system 10.

The three valves include a lock-off valve 46, a boost-pressure valve 50, and a leaning valve 100. The boost-pressure valve 50 is a mechanical valve that opens in relation to boost-pressure received from the turbocharger 30 via a boost-pressure conduit 52. The lock-off valve 46 and the leaning valve 100 are interconnected to a programmable electronic control unit 80. The programmable electronic control unit (ECU) 80 is further interconnected to an oxygen sensor 84 disposed within the exhaust output 38 of the engine 20. An exhaust gas temperature (EGT) sensor 88, which is also disposed within the exhaust output 38, and an RPM sensor 92, which is operative to determine the engine speed at the flywheel, are also interconnected to the ECU 80, as will be discussed herein.

The lock-off valve 46 is operative to prevent any gas flow between the gaseous-fuel supply 40 and the air intake 36 when the engine 20 is not operating. That is, when the electrical system of the engine 20 is inactive, the lock off valve 46 is closed to prevent the typically pressurized gaseous-fuel 40 from traveling through the gas supply conduit 42. Of note, the gaseous-fuel supply 40 may further include regulators in order to provide a predetermined gas pressure to the conduit 42. Furthermore, it will be noted that the size of the gas supply conduit 42 and/or pressure of the gaseous-fuel may be selected to provide a desired flow rate/volume based on one or more requirements of the engine 20.

Figure 2A:
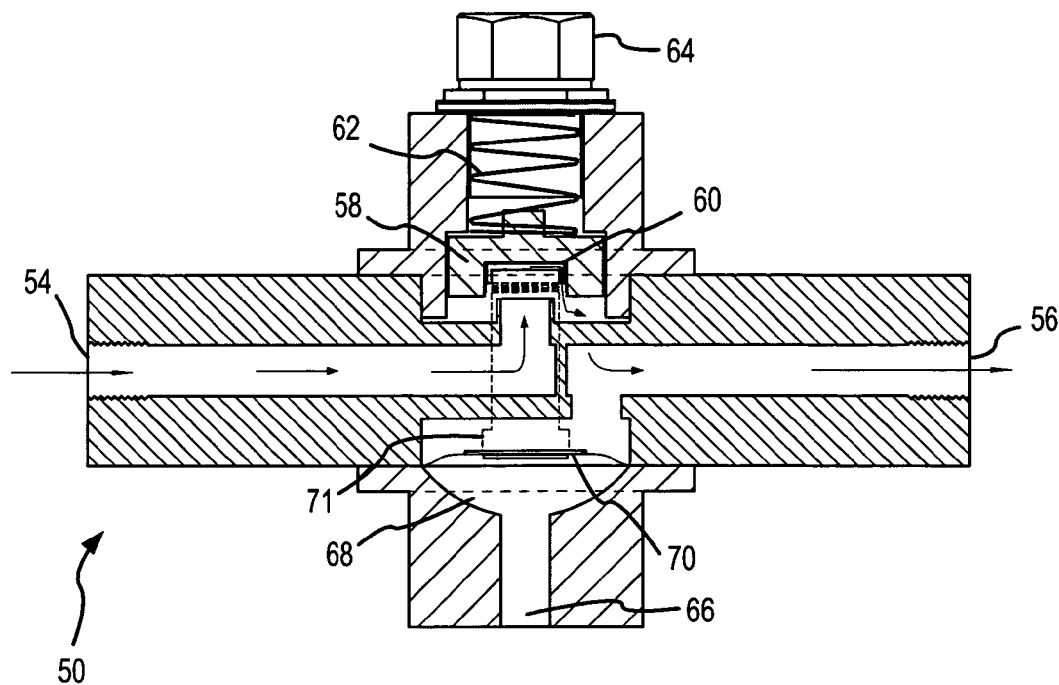
FIG. 2*a* illustrates a first cross-sectional view of a boost-pressure valve utilized with the system of FIG. 1.

Upon starting the engine 20, the lock off valve 46 is opened to allow gaseous-fuel flow between the gas supply 40 and the boost-pressure valve 50. FIG. 2a shows a cross-sectional view of the boost-pressure valve 50. As shown, the boost-pressure valve 50 includes a gas inlet 54 and a gas outlet 56. Disposed between the inlet 54 and the outlet 56 is a diaphragm operated valve assembly. The valve assembly includes a valve body 58, a valve seat 60, a spring 62, and a spring tension adjuster 64. As shown, the valve body 58 and valve seat 60 are generally cylindrical and are disposed in a mating relationship when boost pressure is not present. That is, the spring 62 maintains the valve body 58 against valve seat 60 in the absence of boost pressure from the turbocharger 30, thereby preventing flow of gas through the main portion of the boost-pressure valve 50.

The boost-pressure conduit line 52 has a first end interconnected to the turbocharger 30 and a second end interconnected to the boost-pressure inlet 66 of the boost-pressure valve 50. The boost-pressure inlet 66 is connected to a pressure chamber 68 that is partitioned by a flexible diaphragm 70. The pressure within the pressure chamber 68 from the turbocharger 30 applies upward pressure to the diaphragm 70. The diaphragm 70 is interconnected to the valve body 58 by a pushrod 71. When upward pressure is sufficient, the diaphragm 70 moves upward and the pushrod 71 lifts the valve body 58 from the valve seat 60, thereby opening a fluid path between the gas inlet 54 and outlet 56. That is, when the boost pressure in the pressure chamber 68 overcomes the force applied to the valve body 58 by the spring 62, gaseous-fuel from the gaseous-fuel supply 40 may be delivered through the boost-pressure valve 50 and on to the air intake 36 via the leaning valve 100. As will be appreciated, as the boost pressure increases, the spring 62 and valve seat 60 may be further displaced, thereby progressively increasing the flow of gaseous-fuel through the boost-pressure valve in response to changes in engine operating conditions. Further, the adjustor 64 allows for setting a minimum boost pressure that will open the boost-pressure valve 50.

Figure 2B:
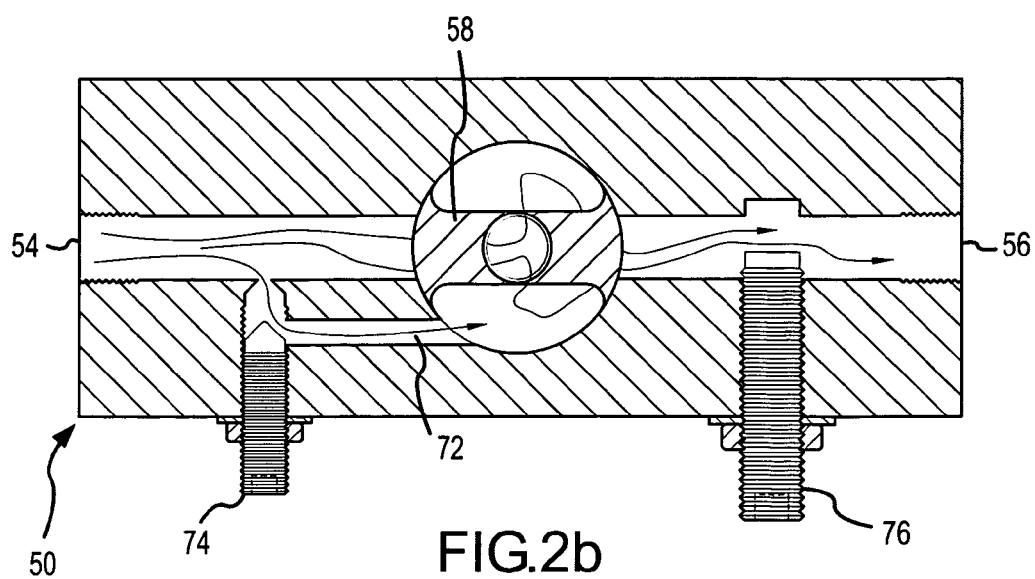
FIG. 2*b* illustrates a second cross-sectional view of the boost-pressure valve of FIG. 2*a;*

At low load levels, the diesel engine 20 does not produce boost pressure and likewise cannot open the boost-pressure valve 50. In this regard, at low engine loads such as idle, no gaseous-fuel is able to pass through the main portion of the boost-pressure valve 50. However, the present configuration of the boost-pressure valve 50 includes an idle bypass port 72. As shown in FIG. 2b, a portion of the gas flow passing through the boost-pressure valve 50 may pass through the idle bypass port 72, through the main valve body and through the outlet 56 while the valve body 58 is seated on the valve seat 60. Furthermore, in the embodiment shown, the idle bypass port 72 includes an idle bypass adjustment screw 74. This idle bypass adjustment screw 74 allows for varying the flow of the gaseous-fuel through the boost-pressure valve 50 when the boost pressure is insufficient to open the main valve assembly. In this regard, gaseous-fuels may be provided to the engine at low load levels such that the benefits of the gaseous-fuel injection (e.g., reducing $NO_x$ and/or particulates) may be realized at low load settings. Stated otherwise, the idle by-pass port 72 maintains a minimum gas flow through the boost pressure valve 50.

FIGS. 2a and 2b illustrate the flow of the gaseous-fuels through the boost-pressure valve 50. As shown in FIG. 2b, the gaseous-fuel enters the gas inlet 54 from the left side of the valve 50 and passes through the main valve assembly. It will be appreciated that the valve 50 may be turned around to accommodate flow in an opposite direction. Returning to FIG. 2a, it will be noted that when the valve assembly is open, the gaseous-fuel passes up through the center portion of the valve 50 and out through the outlet 56. Furthermore, it will be noted in FIG. 2b that the boost-pressure valve 50 includes a fuel mix adjuster screw 76 that is operative to limit the maximum flow of the gaseous-fuel through the boost-pressure valve 50. In this regard, the boost-pressure valve 50 may be utilized with engines having varying flow requirements. That is, when the boost pressure fully opens the main valve assembly, the fuel mix adjuster screw 76 may be set for a particular engine such that a desired maximum flow through the boost-pressure valve 50 is established.

Figure 3:
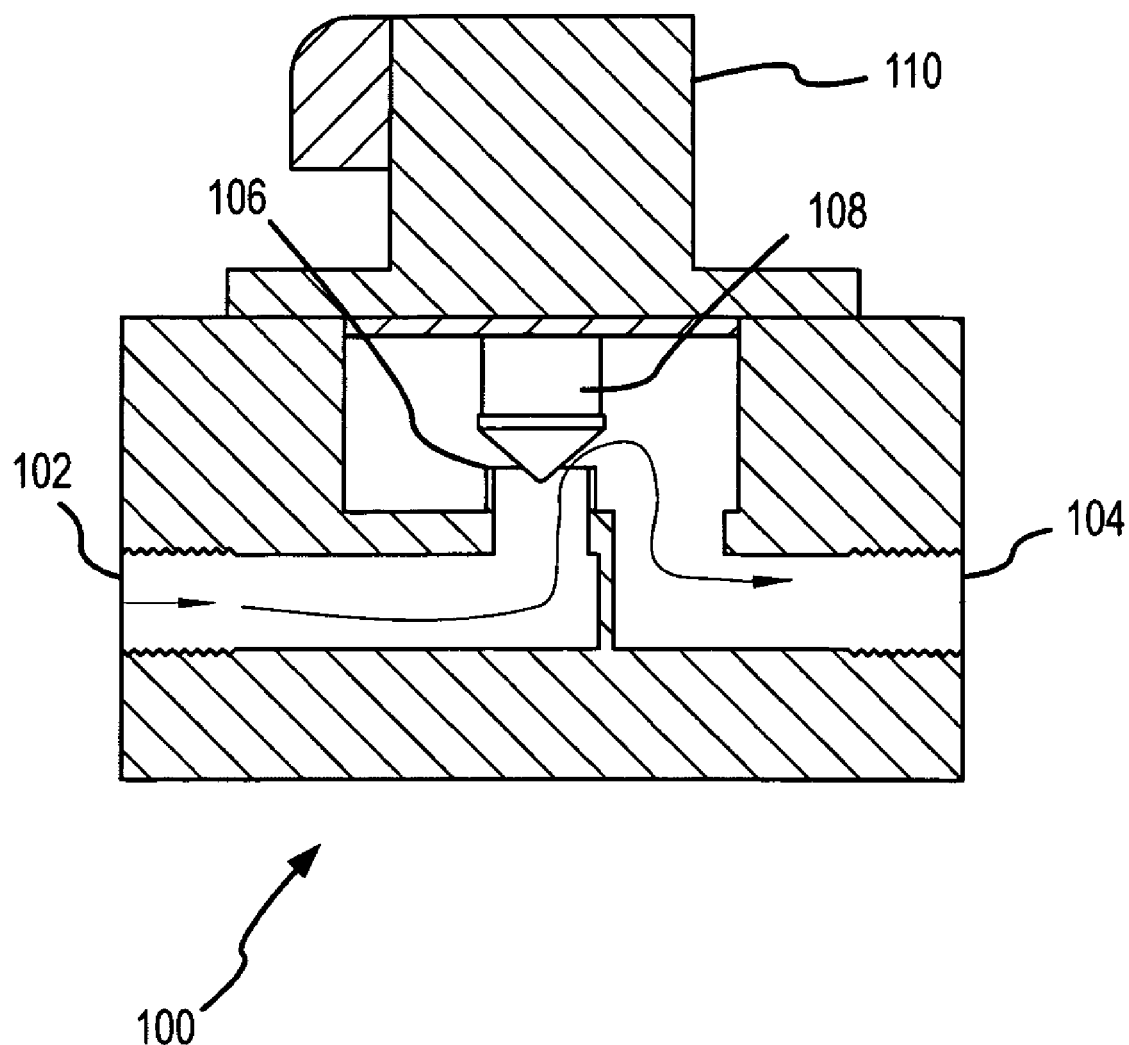
FIG. 3 illustrates one embodiment of a leaning valve utilized with the system of FIG. 1.

FIG. 3 shows one embodiment of the leaning valve 100. In the embodiment shown, the inlet 102 of the leaning valve 100 receives gas flow from the outlet of the outlet 56 of the boost pressure valve 50. As shown, the leaning valve 100 has an inlet 102, an outlet 104, a valve seat 106, and a needle assembly 108. Interconnected to the needle valve 108 is a stepper motor 110. The stepper motor 110 is operative to, in response to signals received from the ECU 80, adjust the position of the needle assembly 108 in order to vary the volume of gaseous-fuel flow (i.e., as received from the boost-pressure valve 50) through the leaning valve 100 prior to being received by the air intake 36. In this regard, it should be noted that at high loads, dual-fuel fumigation systems often suffer from a lack of power. This is due in part to the fact that most gaseous-fuels contain less thermal energy than diesel fuel. Accordingly, at high loads the gaseous-fuel may not provide enough BTUs to the diesel engine 20 for efficient operation. In this regard, the flow of the gaseous-fuel may be restricted by the leaning valve 100. That is, at high loads, where the boost-pressure valve 50 is fully opened, the resulting gaseous-fuel flow may be leaned to provide improved engine performance (i.e., resulting in higher diesel usage to maintain power output). Furthermore, the leaning valve 100 may be utilized to fine-tune the gaseous-fuel flow in order to achieve desired emission outputs.

As noted, the leaning valve 100 is operated by the ECU 80. In its simplest form, the ECU 80 utilizes the oxygen sensor 84, which is disposed in the exhaust output 38 of the engine 20, to generate control signals for adjusting the leaning vale 100. In this regard, the oxygen content of the exhaust gases is monitored by the oxygen sensor 84. The oxygen sensor 84 generates a signal based on this oxygen content, which signal is transmitted to the ECU 80. The ECU 80 may comprise any computer, computer chip, microprocessor, or circuit board. In any case, the ECU 80 controls the operation of the leaning valve 100 in relation to the received oxygen signal. Accordingly, the ECU 80 monitors the signal from the oxygen sensor 84 in a substantially constant manner. Upon receipt of an oxygen signal showing an amount of oxygen below a desired amount in the exhaust conduit 38, the ECU 80 sends a control signal to the leaning valve 100, thereby causing the leaning valve 100 to advance the needle assembly 108 towards the valve seat 106, which provides a reduced gaseous-fuel flow to the air intake 36. Accordingly, this reduced gaseous-fuel flow to the air intake results in a leaner gaseous-fuel/intake air mixture. Conversely, upon receipt of an oxygen content signal showing an excess of oxygen in the exhaust conduit 38, the ECU 80 sends a control signal to the leaning valve 100 causing the needle assembly 108 to be opened relative to the valve seat 106. This causes an increased gaseous-fuel flow and thereby a richer gaseous-fuel/intake air mixture to be provided to the engine 20.

Of particular importance to the fumigation system 10 of the present invention, is the ability for a user to selectively control an oxygen set point for the ECU 80. That is, a user may control the oxygen content of the exhaust gas to enhance engine power and/or emissions. In this regard, the ECU 80 includes an exhaust oxygen content adjuster 82 that may be set by a user to establish a desired oxygen content in the exhaust gases. As will be appreciated, engines from different manufacturers may run at different levels. This is true even for engines having the same power rating (e.g., horsepower). For example, one 300 hp rated engine may run at 25 cubic feet of intake air per second, whereas another 300 hp rated engine may utilize 50 cubic feet of air per second. Likewise, these engines may have varying boost-pressure levels. Furthermore, there may also be variations in the thermal energy of the gaseous-fuel utilized with these engines. For example, there may be thermal energy and/or combustion differences between propane and natural gas. In this regard, the ability to select an oxygen level for the exhaust gases of a particular engine allows for adjusting the fumigation system 10 in accordance with a particular set of operating conditions.

The oxygen sensor 84 allows the ECU 80 to ensure that the fuel provided to the engine 20 (i.e., diesel fuel and the gaseous-fuel) is more fully combusted. That is, if the oxygen level in the exhaust conduit 38 drops below a predetermined minimum, it is known that there is not enough oxygen within the intake air/gaseous-fuel mixture to completely combust the fuel. In this instance, fuel is being utilized inefficiently and hydrocarbons are passing unburned through the engine 20, which results in increased emissions. Accordingly, by adjusting the flow of the gaseous-fuel such that a predetermined minimum oxygen level is maintained within the exhaust output 38, more complete combustion of the diesel fuel and gaseous-fuel mixture is realized and emissions may be reduced.

Though the ECU 80 is operable to control the fumigation system 10 with only a sensor input from the oxygen sensor 84, additional sensors may be utilized to enhance performance of the engine. For example, an exhaust gas temperature gauge 88 and RPM sensor 92 may be incorporated into the system 10 to more finely tune the operation of the fumigation system 10.

Figure 4:
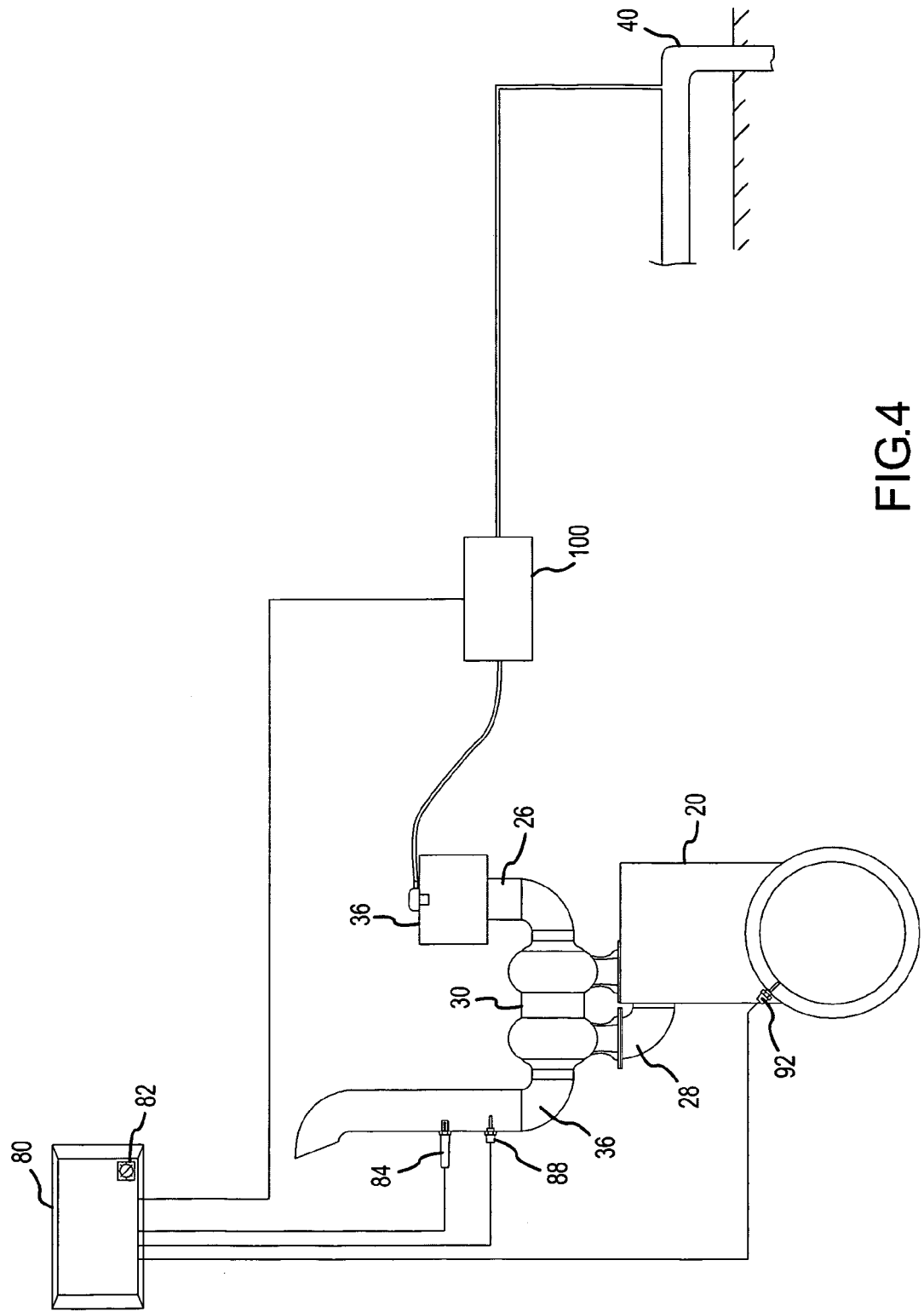
FIG. 4 illustrates a second embodiment of the fumigation system.

FIG. 4 shows a second embodiment of the gaseous-fuel fumigation system 10. As shown, the second embodiment does not utilize the lock-off valve 46 or the boost-pressure valve 50. rather, the system of FIG. 4 relies solely upon the ECU controlled leaning valve 100 to regulate the flow between the gas supply 40 and the air intake 36. Of particular note in FIG. 4 is that the gas supply 40 is received from a gas well 44. In this regard, it will be appreciated the in the production of natural and methane gas, diesel engines are commonly utilized for pumping and compressing gas from wells into pipelines. In this regard, these diesel engines have a ready supply of natural gas that may be utilized with the above-noted systems. However, it will be appreciated that gas received from the well 44 may require dehydration and/or compression prior to use with the diesel engine 20.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A gaseous-fuel fumigation system for interconnection to a diesel engine, comprising:
    a valve disposed in a flow path between a gaseous-fuel supply and an air intake stream of a diesel engine, the valve being operative to regulate a flow volume of a gaseous-fuel through the flow path;
    an oxygen sensor operative to generate a signal indicative of an oxygen content of an exhaust stream of the diesel engine;
    a controller operative to receive the signal from the oxygen sensor and adjust the valve to regulate the flow volume of the gaseous-fuel through the flow path to maintain a predetermined minimum oxygen content in the exhaust stream.

2. The system of claim 1, wherein the controller further comprises:
    an oxygen content adjuster operative to selectively set the predetermined minimum oxygen content.

3. The system of claim 1, wherein the oxygen sensor comprises:
    a wide band oxygen sensor.

4. The system of claim 1, wherein the flow volume of gaseous-fuel through the valve is increased when the oxygen content is above the predetermined minimum oxygen content.

5. The system of claim 1, wherein the flow volume of gaseous-fuel through the valve is decreased when the oxygen content is below the predetermined minimum oxygen content.

6. The system of claim 1, wherein the valve further comprises:
    an adjuster for establishing a predetermined maximum flow volume through the flow path.

7. The system of claim 1, wherein the valve further comprises:
    a by-pass port for maintaining a predetermined minimum flow volume through the flow path.

8. The system of claim 1, wherein the gaseous-fuel supply comprises at least one of:
    natural gas;
    methane gas;
    propane;
    hydrogen;
    vaporized ethanol; and
    vaporized methanol.

9. The systems of claim 1, wherein the gaseous-fuel supply comprises a gas well.

10. The system of claim 1, wherein the predetermined minimum oxygen content is based at least in part on one of:
    a gaseous-fuel parameter; and
    an operating parameter of the engine.

11. A method for operating a gaseous-fuel fumigation system interconnected to a diesel engine, comprising:
    establishing a gaseous-fuel flow path between a gaseous-fuel supply and an intake stream of a diesel engine;
    identifying an oxygen content of an exhaust stream of the engine;

based on the oxygen content, regulating a flow volume of gaseous-fuel through the flow path to maintain a predetermined oxygen content in the exhaust stream; and injecting the second flow volume into an air intake stream of the engine.

12. The method of claim 11, wherein establishing the gaseous-fuel flow path comprises establishing a first flow volume of gaseous-fuel and wherein regulating the flow volume comprises establishing a second flow volume.

13. The method of claim 12, wherein the second flow volume is between zero and one hundred percent of the first flow volume.

14. The method of claim 11, wherein the regulating step comprises one of increasing and decreasing the flow volume to maintain the predetermined oxygen content in the exhaust stream.

15. The method of claim 11, further comprising:
identifying a desired oxygen content for the engine based on at least one engine specific parameter; and
setting a controller to the desired oxygen content wherein the controller is operative a regulate the flow volume of gaseous-fuel through the flow path to maintain the desired oxygen content in the exhaust stream.

16. The method of claim 11, wherein regulating the flow volume comprises operating at least a first valve in a flow path between the gaseous fuel supply and the air intake stream of the diesel engine.

17. A gaseous-fuel fumigation system for interconnection to a diesel engine, comprising:

an oxygen senor for generating an output related to an oxygen content of an exhaust gas stream;
an electronic control unit including programming operable to:
receive the output related to the oxygen content of the exhaust gas stream; and
generate a control output signal for adjusting a flow volume of a gaseous fuel injected into an intake of the engine; and
a regulator operative to receive the control output signal and regulate gaseous-fuel flow through a flow path between a gaseous fuel supply and the engine.

18. The system of claim 17, wherein the electronic control unit generates a output signal to increase a flow volume of gaseous-fuel through the flow path when the oxygen content is above a predetermined oxygen content.

19. The system of claim 17, wherein the electronic control unit generates a output signal to increase a flow volume of gaseous-fuel through the flow path when the oxygen content is below a predetermined oxygen content.

20. The system of claim 17, further comprising:
an exhaust gas temperature sensor for generating a temperature output related to a temperature of the exhaust gas stream, wherein the electronic controller is operative to receive the temperature output.

* * * * *